US011986985B2

(12) United States Patent
Kubo

(10) Patent No.: US 11,986,985 B2
(45) Date of Patent: May 21, 2024

(54) APPARATUS FOR TAKING OUT MOLDED PRODUCT AND METHOD OF MONITORING OPERATIONS THEREOF

(71) Applicant: Yushin Precision Equipment Co., Ltd., Kyoto (JP)

(72) Inventor: Sanai Kubo, Kyoto (JP)

(73) Assignee: YUSHIN PRECISION EQUIPMENT CO., LTD., Kyoto (JP)

( * ) Notice: Subject to any disclaimer, the term of this patent is extended or adjusted under 35 U.S.C. 154(b) by 411 days.

(21) Appl. No.: 17/536,785

(22) Filed: Nov. 29, 2021

(65) Prior Publication Data

US 2022/0168940 A1 Jun. 2, 2022

(30) Foreign Application Priority Data

Nov. 27, 2020 (JP) ................................. 2020-197183

(51) Int. Cl.
*B29C 45/76* (2006.01)
*B29C 45/40* (2006.01)
*B29C 45/42* (2006.01)

(52) U.S. Cl.
CPC .. *B29C 45/7626* (2013.01); *B29C 2045/7606* (2013.01); *B29C 2945/76076* (2013.01); *B29C 2945/76418* (2013.01)

(58) Field of Classification Search
CPC ..... B29C 45/76; B29C 49/76; B29C 45/7626; B29C 2045/7606; B29C 2945/76076; B29C 2945/76418; B29C 45/78; B29C 2045/1796; B29C 45/77; G05B 19/048; G05B 23/00; G01N 29/0609; G01V 8/00; G01D 3/00
See application file for complete search history.

(56) References Cited

U.S. PATENT DOCUMENTS

| | | | |
|---|---|---|---|
| 5,639,486 A * | 6/1997 | Yamaguchi | B29C 45/7626 264/40.5 |
| 2011/0115120 A1* | 5/2011 | Hattori | B29C 45/7306 264/237 |
| 2017/0287147 A1* | 10/2017 | Takahashi | G06T 7/35 |
| 2018/0021992 A1* | 1/2018 | Moss | B29C 45/2725 425/146 |

FOREIGN PATENT DOCUMENTS

| | | |
|---|---|---|
| JP | 2013-152973 | 8/2013 |
| WO | 2013/111636 | 8/2013 |

* cited by examiner

*Primary Examiner* — Brandi N Hopkins
(74) *Attorney, Agent, or Firm* — Rankin, Hill & Clark LLP

(57) ABSTRACT

A cycle time administration section 3 of an apparatus for taking out a molded product of the present invention includes: a measurement section 5 for measuring a cycle time for every one cycle of taking out a molded product; a setting and storing section 7 for setting and storing a target cycle time; a comparison section 9 for comparing the measured cycle time and the target cycle time for every one cycle; a counting section 11 for counting the number of times that the measured cycle times consecutively exceed target time, following the measured cycle time that has first exceeded the target cycle time, if it is determined that the measured cycle time has exceeded the target cycle time as a result of the comparing; and an outputting section 13 for outputting a detection signal if the counted number of times is more than n times.

20 Claims, 5 Drawing Sheets

APPARATUS FOR TAKING OUT MOLDED PRODUCT AND METHOD OF MONITORING OPERATIONS THEREOF

TECHNICAL FIELD

The present invention relates to an apparatus for taking out a molded product and a method of monitoring operations thereof.

BACKGROUND ART

There is known an apparatus for a manufacturing line that reports an abnormal condition if a cycle time is delayed from a reference time. (For example, JP2013-152973A relates to a substrate manufacturing line.)

Various reasons for delayed cycle time can be considered. For example, after an event occurs that an apparatus for taking out a molded product stops for a while and then is restarted (so called "short-time stop" due to partial stop of a facility or operation fault of the facility, namely, a breakdown that can readily be restored as specified by JIS Z 8141:2001), an operator of the apparatus is late or inadequate in dealing with the breakdown. This may be one example reason for delayed cycle time.

SUMMARY OF THE INVENTION

An object of the present invention is to provide an apparatus for taking out a molded product and a method of monitoring operations thereof that can detect the above-mentioned short-time stop by a simple method in a situation where after the cycle time is delayed, an operator of the apparatus is late or inadequate in dealing with a short-time stop.

In one aspect of the present invention, there is provided a method of monitoring operations of an apparatus for taking out a molded product. The method comprises the steps of: measuring a cycle time required for one cycle of taking out a molded product from an injection molding machine; setting a target cycle time allowed by an administrator; comparing the cycle time measured every one cycle time and the target cycle time; counting the number of times that the measured cycle times consecutively exceed the target cycle time, following the measured cycle time that has first exceeded the target cycle time, if it is determined that the measured cycle time has exceeded the target cycle time as a result of the comparing; and outputting a detection signal if the counted number of times that the measured cycle times consecutively exceed the target cycle time is more than n times where n is an integer of one or more.

When the number of times that the measured cycle times consecutively exceed the target cycle time is more than n times, namely two or more times in total, it can be assumed that a short-time stop occurs due to some causes and the operator is late or inadequate in dealing with the short-time stop. Therefore, according to the present, when a detection signal is output, the signal urges the administrator to confirm if the operator's work is appropriate by checking the number of occurrences and timing of detection signals, thereby enabling the administrator to recognize the necessity of guidance and education for the operators. When a detection signal is output, it is not necessary to stop the operations of the apparatus for taking out a molded product.

The method may comprise the step of counting the number of times that the measured cycle times consecutively exceed the target cycle time, if it is determined that the measured cycle time has exceeded the target cycle time as a result of the comparing; and the step of outputting a detection signal if it is determined that the measured cycle times consecutively exceed the target cycle time more than m times where m is an integer of two or more. Also with this configuration, the equivalent effect is obtainable.

It is preferred that the target cycle time can be set only by the administrator of the apparatus for taking out a molded product. This is because there is a risk that time setting different from the reference time or scheduled time may be performed, which leads to failure to attain the purpose of monitoring operations of the apparatus.

In the step of counting the number of times that the measured cycle times consecutively exceed the target cycle time, the counting is reset if the measured cycle time falls below the target cycle time before the number of times of exceeding the target cycle time reaches n times. With this, if the operator's response to the delayed cycle time is appropriate, the detection signal is refrained from being output, and the detection signal is output only when the measured cycle times consecutively exceed target cycle time, thereby alleviating the administrator's workload.

After the detection signal is output, a next detection signal may not be output until the measured cycle time falls below the target cycle time. With this, for example, by checking the interval between a detection signal occurring earlier and another detection signal occurring subsequently, it is possible to know the operator's responsive capability. Further, when the administrator inadvertently sets a target cycle time which it is difficult for the measured cycle time to fall below, the detection signal will not consecutively be output, thereby not disturbing the operator.

The method of monitoring operations of an apparatus for taking out a molded product may further comprise the step of storing the cycle time that is below the target cycle time before outputting the detection signal and the cycle time that exceeds the target cycle time before outputting the detection signal, once the detection signal is output. With this, the administrator can check not only the history of the cycle time when the detection signal is output but also the lapse time until the target cycle time is exceeded (the time required for the response), thereby helping the administrator to confirm the necessity of the guidance and education for the operators.

In another aspect of the present invention, there is provided an apparatus for taking out a molded product, including a cycle time administration section capable of setting a target cycle time for a cycle time required for one cycle of taking out a molded product from an injection molding machine.

The cycle time administration section according to the present invention comprises: a measurement section operable to measure a cycle time every one cycle; a setting and storing section operable to set and store a target cycle time; a comparison section operable to compare the measured cycle time and the target cycle time; a counting section operable to count the number of times that the measured cycle times consecutively exceed the target cycle time, following the measured cycle time that has first exceeded the target cycle time, if it is determined that the measured cycle time has exceeded the target cycle time as a result of comparison performed by the comparison section; and an outputting section operable to output a detection signal if the counted number of times that the measured cycle times consecutively exceed the target cycle time is more than n times where n is an integer of one or more.

In place of the above-mentioned configuration, the cycle time administration section may comprise a counting section operable to count the number of times that the measured cycle times consecutively exceed the target cycle time, if it is determined that the measured cycle time has exceeded the target cycle time as a result of comparison performed by the comparison section, and an outputting section operable to output a detection signal if it is determined that the measured cycle times consecutively exceed the target cycle time more than m times where m is an integer of two or more.

The cycle time administration section further comprises a history storing section operable to store a history of at least a date and a time when the detection signal is output. The history storing section may be configured to store the measured cycle time that is below the target cycle time before outputting the detection signal and the measured cycle time that exceeds the target cycle time before outputting the detection signal once the detection signal is output.

It is preferred that the setting and storing section is allowed to be set only by the administrator for operators handling the apparatus for taking out a molded product. This is intended to avoid s risk that the time setting different from the administrator's reference time or scheduled time may inadvertently be performed. In such risk occurs, the purpose of monitoring the operations of the apparatus for taking out a molded product will not be attained.

Further, the apparatus for taking out a molded product may comprise an alarm generator driven by the detection signal to output an alarm. With the alarm generator, the administrator can readily know that a detection signal has been output. Furthermore, the apparatus for taking out a molded product may comprise a display section operable to display a detection indication once the detection signal is output. With this, it is easy to recognize the output of a detection signal by checking the display section.

It is preferred that the outputting section of a detection signal is configured not to output, after the detection signal is output, a next detection signal is not output until the measured cycle time falls below the target cycle time.

DETAILED DESCRIPTION OF EMBODIMENT

Now, with reference to the accompanying drawings, an embodiment of an apparatus for taking out a molded product and a method of monitoring operations thereof will be described below in detail.

Figure 1:
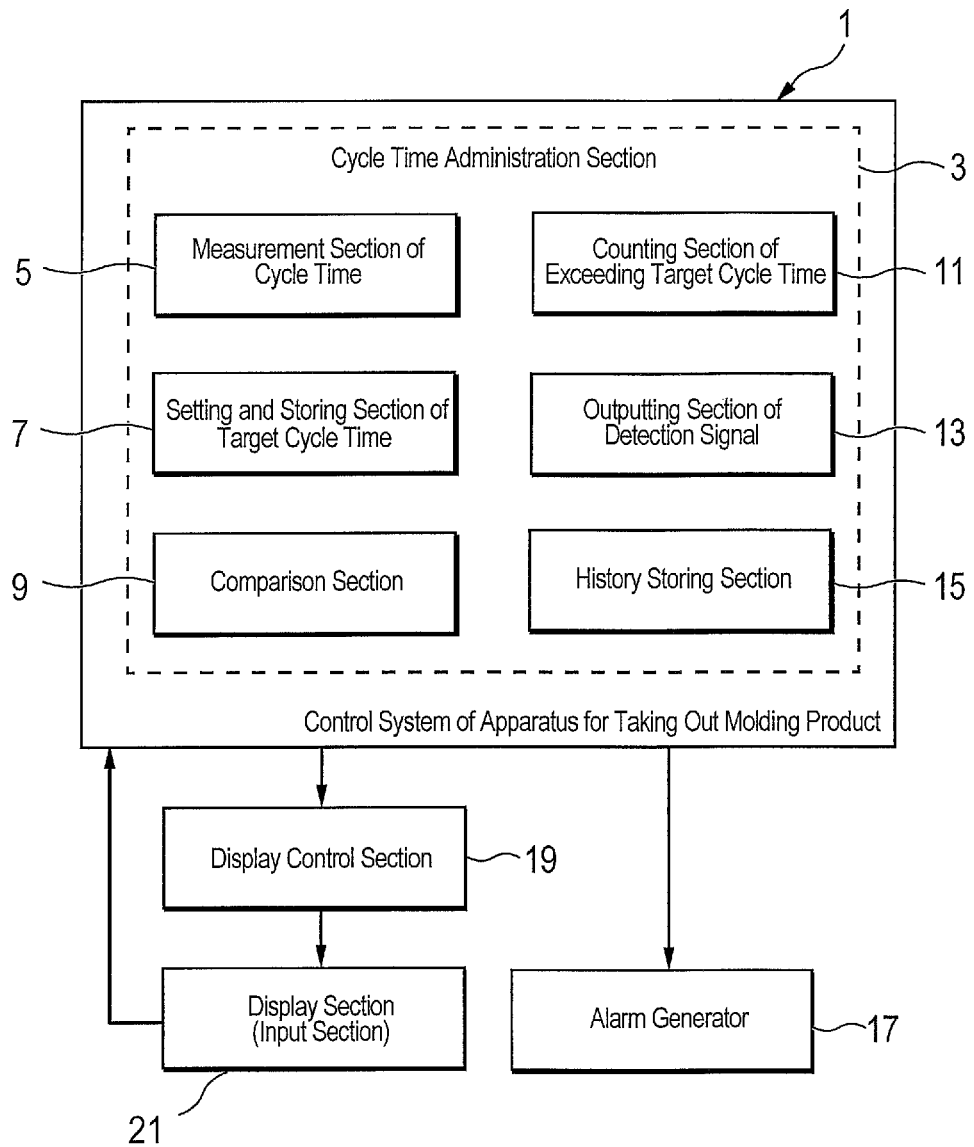
FIG. 1 is a block diagram illustrating the main configuration of a control system of an apparatus for taking out a molded product according to an embodiment of the present invention.

FIG. 1 is a block diagram illustrating the main configuration of a control system of an apparatus for taking out a molded product according to an embodiment of the present invention.

An apparatus for taking out a molded product according to the embodiment of the present invention (hereinafter referred to simply as the apparatus) is installed above or adjacent to an injection molding machine, not illustrated. The apparatus takes out a molded product from a mold of the injection molding machine, performs gate cutting, and places the product at a predetermined location. The apparatus is controlled by a control system 1.

As illustrated in FIG. 1, the control system 1 includes a cycle time administration section 3 capable of setting a target cycle time for a cycle time required for one cycle of taking out a molded product from the injection molding machine. The cycle time administration section 3 comprises a measurement section 5 of a cycle time, a setting and storing section 7 of a target cycle time, a comparison section 9, a counting section 11 of the number of times that the target time is exceeded, an outputting section 13 of a detection signal, and a history storing section 15. The apparatus further comprises an alarm generator 17 and a display section 21 operable to display on a screen, as controlled by a display control section 19, various information required to perform teaching, and predetermined setting for a cycle time, etc.

The measurement section 5 measures a cycle time every one cycle in which the apparatus takes out a molded product from the injection molding machine. The measurement section 5 is implemented using a publicly known analog or digital timer operable to start time counting as driven a start signal and stop the time counting as caused by a stop signal. Here, the term "cycle time" means the time elapsed that the apparatus starts movement from a starting location, takes out a molded product from the mold, releases the molded product at a releasing location, and returns to the initial starting location. The measurement section 5 measures a cycle time on a basis of the start signal output from the injection molding machine at the start point and a stop signal output from the apparatus at the end point.

The setting and storing section 7 sets and stores a target cycle time for a cycle time required for one cycle of taking out a molded product from the injection molding machine. A password is set for the setting and storing section 7. Here, an operator of the apparatus cannot set the target cycle time, and can be set only by the administrator who knows the password. The password is set using the setting screen displayed on the screen of the display section 21.

The comparison section 9 compares the cycle time measured by the measurement section 5 and the target cycle time stored in the setting and storing section 7 for every one cycle.

The counting section 11 counts the number of times that the measured cycle times consecutively exceed the target cycle time, following the measured cycle time that has first exceeded the target cycle time, if it is determined that the measured cycle time has exceeded the target cycle time as a result of comparison performed by the comparison section 9. The counting section 11 resets the counting if the measured cycle time falls below the target cycle time before the number of times of exceeding the target cycle time reaches n times where n is an integer of one or more. With this, if the operator's response is appropriate, the detection signal is not output, and the detection signal is output only when the measured cycle times consecutively exceed target cycle time, thereby avoiding the workload more than necessary on the administrator.

The outputting section 13 outputs a detection signal if the counted number of times that the measured cycle times consecutively exceed the target cycle time is more than n times where n is an integer of one or more. In the present embodiment, n is set to 2, if the measured cycle times consecutively exceed the target cycle time three times in total, a detection signal is output.

The outputting section 13 may be configured to repeatedly output a detection signal until the measured cycle time falls below the target cycle time, or to keep outputting a detection signal. Alternatively, the outputting section 13 may be configured not to output a next detection signal until the measured cycle time falls below the target cycle time after the detection signal is output. With this, for example, by checking the interval between a detection signal occurring earlier and another detection signal occurring subsequently, it is possible to know the operator's responsive capability.

In the present embodiment, an alarm is generated by driving an alarm generator 17 by a detection signal. Generation of an alarm is not an essential requirement for the present embodiment.

The history storing section 15 stores a history of a date and a time when the detection signal is output, and also stores the measured cycle time that is below the target cycle time before outputting the detection signal and the measured cycle time that exceeds the target cycle time before outputting the detection signal. The information stored in the history storing section 15 is enabled to be displayed on a display screen of the display section 21 by the administrator entering a password. The history storing section 15 may be configured to store the measured cycle time that is below the target cycle time before outputting the detection signal and the measured cycle time that exceeds the target cycle time before outputting the detection signal. With this, the administrator can check not only the history of the cycle times when the detection signal is output but also the lapse time until the target cycle time is exceeded (the time required for the response), thereby helping the administrator to confirm the necessity of the guidance and education for the operators.

The display screen of the display section 21 as described earlier has a function of a touch panel, and works not only as a display screen for displaying the conditions of the apparatus, the cycle times, etc. but also as an input portion for setting the target cycle time. In the present embodiment, once a detection signal is output, a popup window PW as described later and a warning icon WI are displayed on the display screen of the display section 21 to show detection results.

[Flowchart]

Figure 2:
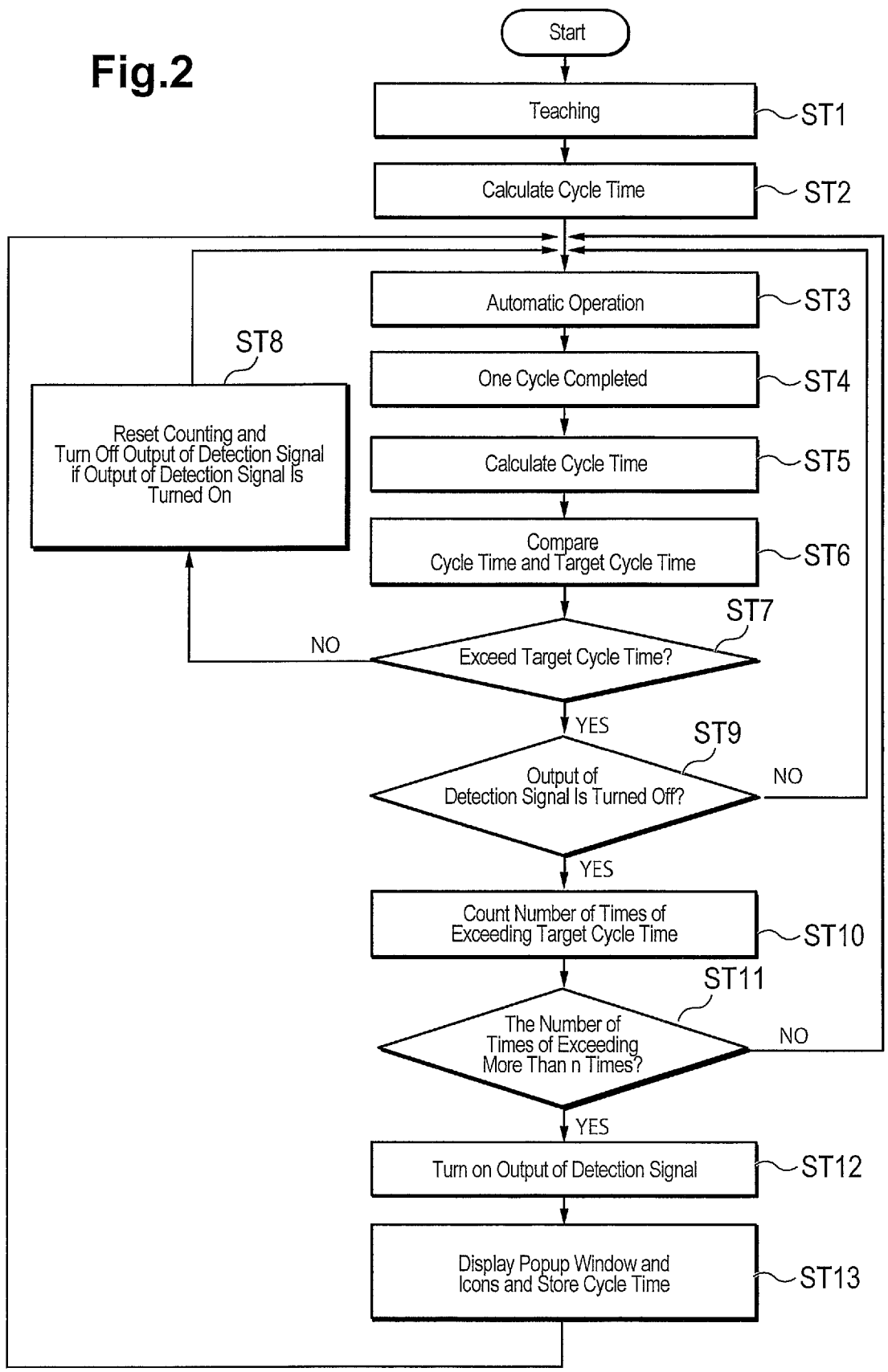
FIG. 2 is a flowchart illustrating the process flow including a flowchart of a program used when the main portion of the control system of the apparatus for taking out a molded product according to the embodiment of the present invention is implemented on a computer.

FIG. 2 is a flowchart illustrating the process flow (method steps) including a flowchart of a program used when implementing on a computer the main portion of the control system 1 of the apparatus for taking out a molded product according to the embodiment of the present invention.

Prior to starting the automatic operation, teaching of the apparatus for taking out a molded product is performed (in step ST1), and the administrator sets an allowable target cycle time (in step ST2).

Figure 3:
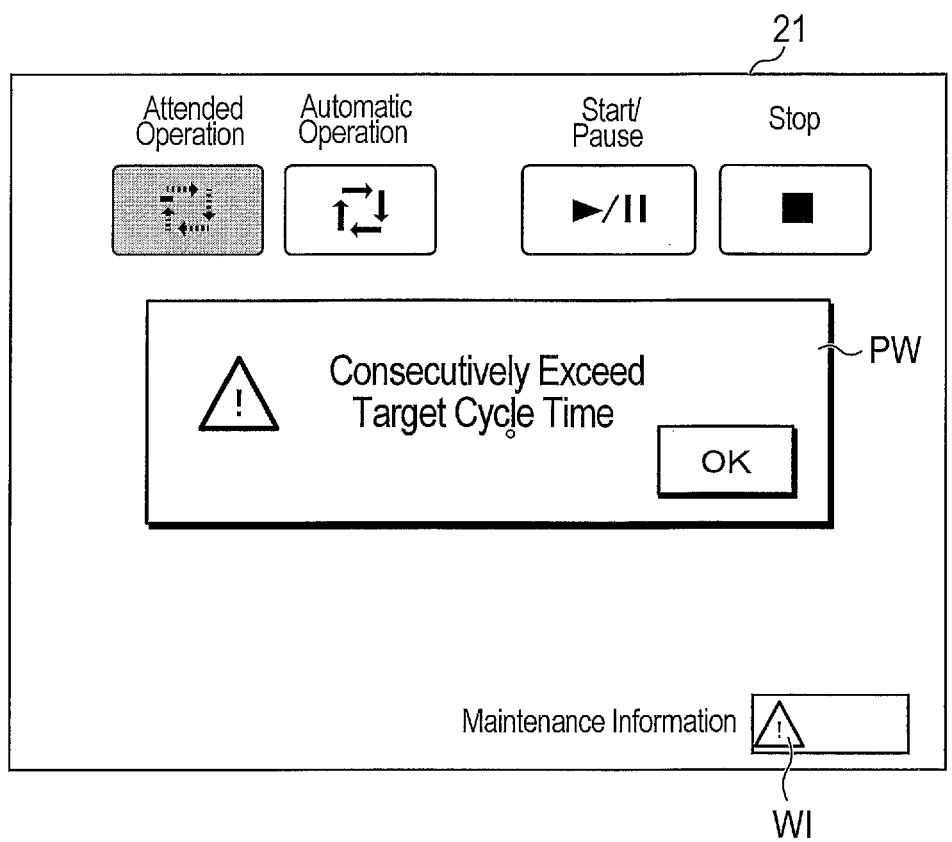
FIG. 3 shows examples of a popup window and a warning icon that are displayed on the display section.

The automatic operation is started (in step ST3); then one cycle is finished (in step ST4); and the measurement section 5 measures a cycle time for every one cycle (in step ST5). When the measurement result is output, the comparison section 9 compares the measured cycle time and the target cycle time (in step ST6). If the measured cycle time does not exceed target cycle time, the measurement result is reset (the counted number of times of exceeding the target cycle time is reset and output of a detection signal is turned off if turned on) and the process goes back to step ST3 (from step ST7 to step ST8). If the measured cycle time exceeds the target cycle time, it is checked whether the output of a detection signal is turned on or off and then the process goes back to step ST3. This is intended to prevent a detection signal from being continuously output when the administrator inadvertently sets the target cycle time which it is difficult to fall below. If the output of a detection signal is turned off, the counting section 11 counts the number of times that measured cycle times consecutively exceed the target cycle time (in step ST10). Steps ST3 through ST10 are repeated (in step ST11). If the measured cycle times consecutively exceed the target cycle time n times (in the present embodiment, n is twice, and three times in total), a detection signal is output (in step ST12). Once the detection signal is output, as illustrated in FIG. 3, the popup window PW and the warning icon PI are displayed on the display section 21 (instep ST13). Besides, the history storing section 15 stores a history of the date and time when the detection signal is output, and the cycle time below the target cycle time before outputting the detection signal (namely, a normal cycle time three cycles before the detection signal is output) and the cycle time exceeding the target cycle time before the detection signal is output (in the present embodiment, cycle times for the recent three cycles).

The popup window PW can be erased from the display section 21 by pressing the "ON" button which means confirmation is made, but the warning icon WI remains displayed on the screen as far as the administrator does not performs a reset operation.

Figure 4:
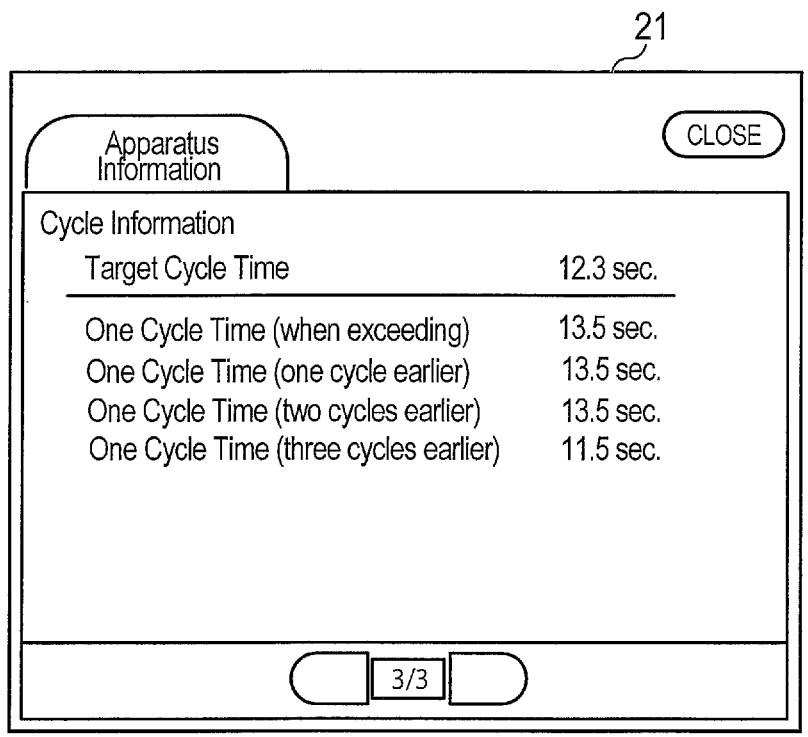
FIG. 4 is an example history displayed on the display section.

FIG. 4 is an example history displayed on the display screen of the display section 21. In this example, the set target cycle time, the normal cycle time three cycles before the detection signal is output, and the recent three cycle times are displayed.

[Specific Example Based on Timing Chart]

Figure 5:
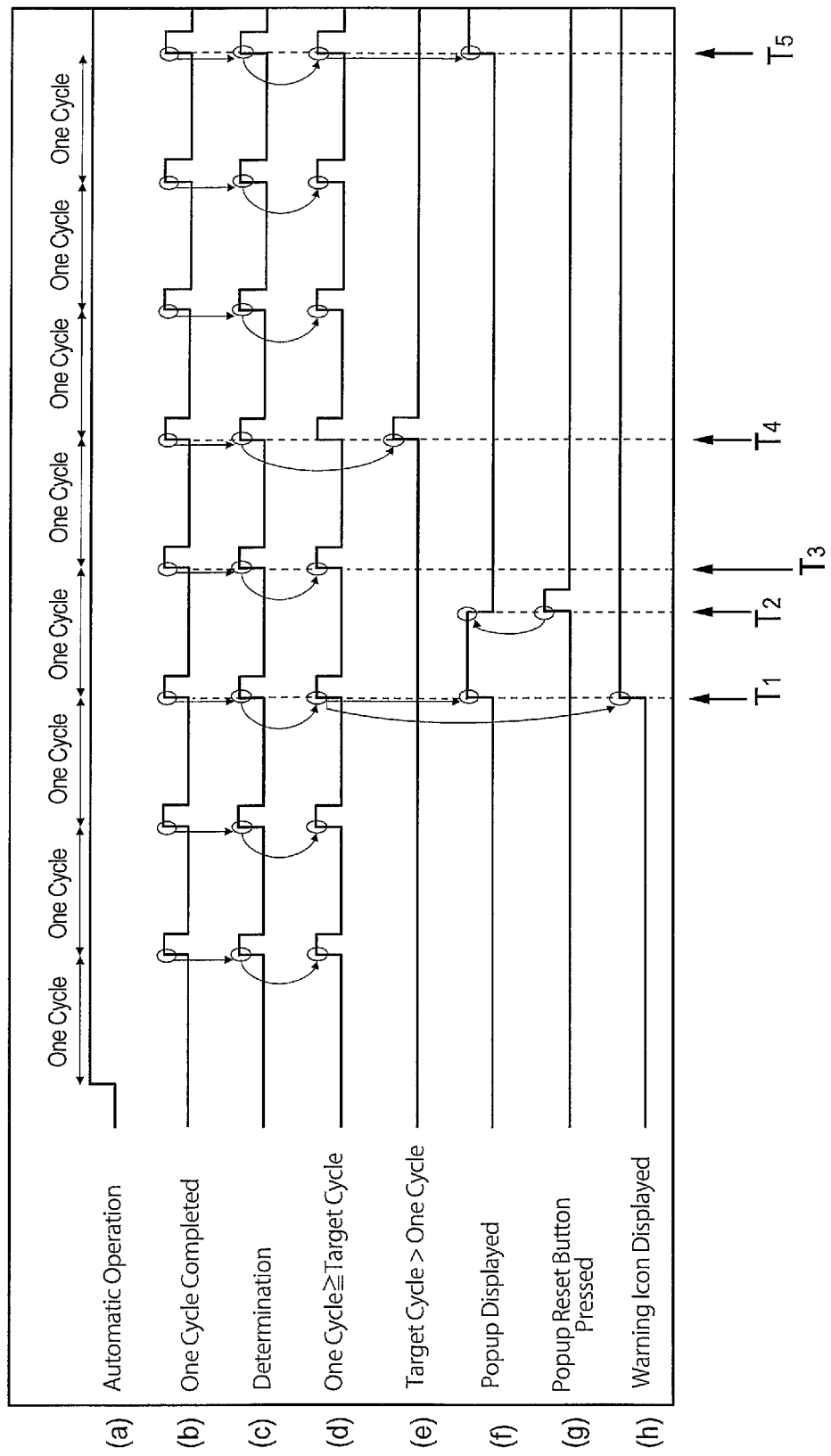
FIG. 5 is an example timing chart for the signals output during the automatic operation of the apparatus for taking out a molded product.

FIG. 5 is an example timing chart for the signals output within the control system 1 during the automatic operation of the apparatus for taking out a molded product. In this timing chart, from the top, the illustrated signals means: (a) Automatic Operation: automatic operation is performed, (b) One Cycle Completed: one cycle is completed, (c) Determination: determination is made, (d) One Cycle Equal to or More than Target Cycle: cycle time exceeds the target cycle time (hereinafter referred to as exceeding signal), (e) Cycle Time Below Target Cycle: the cycle time falls below the target cycle time, (hereinafter referred to as normal signal), (f) Popup Displayed: detection signal is output to display a popup window (hereinafter referred to as popup signal), (g) Popup Reset Button Pressed: a popup reset button is pressed to turn off the popup window (hereinafter referred to as popup turn-off signal), and (h) Warning Icon Displayed: a detection signal is output to display the warning icon (hereinafter referred to as warning icon signal).

For example, the following can be known from the timing chart:

(1) For every one cycle, the comparison section 9 compares the measured cycle time and the target cycle time, and if the exceeding signal as defined in (d) is consecutively output three times, a detection signal is output to subsequently output a popup signal as defined in (f) and a warning icon signal as defined in (h) (at Timing T3);

(2) The popup window disappears when a popup turn-off signal (f) is output (at timing T2), but the warning icon signal (h) is continuously output;

(3) if an exceeding signal (d) is consecutively output four times, a detection signal is not output at the fourth exceeding signal (d) and a popup signal (f) is not output (at timing T3); and (4) after the detection signal is output, a normal signal (e) is output (at timing T4) to reset the determination (refer to step ST8 in FIG. 2), and thereafter if an exceeding signal (d) is again consecutively output three times, a next detection signal is output (at timing T5).

In the above-mentioned embodiment is shown by way of example. The present invention is not limited by the above-mentioned embodiment as far as the scope of the claims is not departed.

For example, in the present embodiment, when the measured cycle times exceed the target cycle time, if the number of times of exceeding is more than one, namely, n=one or more in step ST11, a detection signal is output. Namely, n=one or more, except the first time of exceeding, it is determined that the measured cycle times consecutively exceed the target cycle time. In contrast therewith, when the measured cycle time exceeds the target cycle time, the number of times of exceeding is counted including the first exceeding. If the counted number of times of exceeding exceed m times, namely, m=two or more, it may be determined that the measured cycle times consecutively exceed the target cycle time. In this case, when the counting section 11 counts m times that the measured cycle times consecutively exceed the target cycle time, the outputting section 13 outputs a detection signal.

INDUSTRIAL APPLICABILITY

According to the present invention, an apparatus for taking out a molded product and a method of monitoring operations thereof can be provided so as to be capable of detecting by a simple method those cases where the operator of the apparatus is late or inappropriate in dealing with so-called short-time stop of the apparatus.

What is claimed is:

1. A method of monitoring operations of an apparatus for taking out a molded product, comprising the steps of:
   measuring a cycle time required for one cycle of taking out a molded product from an injection molding machine;
   setting a target cycle time allowed by an administrator;
   comparing the cycle time measured every one cycle and the target cycle time;
   counting the number of times that the measured cycle times consecutively exceed the target cycle time, following the measured cycle time that has first exceeded the target cycle time, if it is determined that the measured cycle time has exceeded the target cycle time as a result of the comparing; and
   outputting a detection signal if the counted number of times that the measured cycle times consecutively exceed the target cycle time is more than n times where n is an integer of one or more.

2. The method of monitoring operations of an apparatus for taking out a molded product according to claim 1, wherein:
   the target cycle time can be set only by the administrator of the apparatus for taking out a molded product.

3. The method of monitoring operations of an apparatus for taking out a molded product according to claim 1, wherein:
   in the step of counting the number of times that the measured cycle times consecutively exceed the target cycle time, resetting the counting if the measured cycle time falls below the target cycle time before the number of times of exceeding the target cycle time reaches the n times.

4. The method of monitoring operations of an apparatus for taking out a molded product according to claim 1, wherein:
   after the detection signal is output, a next detection signal is not output until the measured cycle time falls below the target cycle time.

5. The method of monitoring operations of an apparatus for taking out a molded product according to claim 1, further comprising the step of:
   storing the measured cycle time that is below the target cycle time before outputting the detection signal and the measured cycle time that exceeds the target cycle time before outputting the detection signal, once the detection signal is output.

6. A method of monitoring operations of an apparatus for taking out a molded product, comprising the steps of:
   measuring a cycle time required for one cycle of taking out a molded product from an injection molding machine;
   setting a target cycle time allowed by an administrator;
   comparing the cycle time measured every one cycle and the target cycle time;
   counting the number of times that the measured cycle times consecutively exceed the target cycle time, if it is determined that the measured cycle time has exceeded the target cycle time as a result of the comparing; and
   outputting a detection signal if it is determined that the measured cycle times consecutively exceed the target cycle time more than m times where m is an integer of two or more.

7. An apparatus for taking out a molded product, including a cycle time administration section capable of setting a target cycle time for a cycle time required for one cycle of taking out a molded product from an injection molding machine, wherein the cycle time administration section comprises:
   a measurement section operable to measure the cycle time every one cycle;
   a setting and storing section operable to set and store the target cycle time;
   a comparison section operable to compare the measured cycle time and the target cycle time;
   a counting section operable to count the number of times that the measured cycle times consecutively exceed the target cycle time, following the measured cycle time that has first exceeded the target cycle time, if it is determined that the measured cycle time has exceeded the target cycle time as a result of comparison performed by the comparison section; and
   an outputting section operable to output a detection signal if the counted number of times that the measured cycle times consecutively exceed the target cycle time is more than n times where n is an integer of one or more.

8. The apparatus for taking out a molded product according to claim 7, wherein:

the cycle time administration section further comprises a history storing section operable to store a history of at least a date and a time when the detection signal is output.

9. The apparatus for taking out a molded product according to claim 7, wherein:
the setting and storing section is allowed to be set only by the administrator for operators handling the apparatus for taking out a molded product.

10. The apparatus for taking out a molded product according to claim 7, further comprising:
an alarm generator driven by the detection signal to output an alarm.

11. The apparatus for taking out a molded product according to claim 7, further comprising:
a display section operable to display a detection indication once the detection signal is output.

12. The apparatus for taking out a molded product according to claim 7, wherein:
after the detection signal is output, a next detection signal is not output until the measured cycle time falls below the target cycle time.

13. The apparatus for taking out a molded product according to claim 7, wherein:
the history storing section stores the measured cycle time that is below the target cycle time before outputting the detection signal and the measured cycle time that exceeds the target cycle time before outputting the detection signal, once the detection signal is output.

14. An apparatus for taking out a molded product, including a cycle time administration section capable of setting a target cycle time for a cycle time required for one cycle of taking out a molded product from an injection molding machine, wherein the cycle time administration section comprises:
a measurement section operable to measure the cycle time every one cycle;
a setting and storing section operable to set and store the target cycle time;
a comparison section operable to compare the measured cycle time and the target cycle time;
a counting section operable to count the number of times that the measured cycle times consecutively exceed the target cycle time, if it is determined that the measured cycle time has exceeded the target cycle time as a result of comparison performed by the comparison section; and
an outputting section operable to output a detection signal if it is determined that the measured cycle times consecutively exceed the target cycle time more than m times where m is an integer of two or more.

15. The apparatus for taking out a molded product according to claim 14, wherein:
the cycle time administration section further comprises a history storing section operable to store a history of at least a date and a time when the detection signal is output.

16. The apparatus for taking out a molded product according to claim 14, wherein:
the setting and storing section is allowed to be set only by the administrator for operators handling the apparatus for taking out a molded product.

17. The apparatus for taking out a molded product according to claim 14, further comprising:
an alarm generator driven by the detection signal to output an alarm.

18. The apparatus for taking out a molded product according to claim 14, further comprising:
a display section operable to display a detection indication once the detection signal is output.

19. The apparatus for taking out a molded product according to claim 14, wherein:
after the detection signal is output, a next detection signal is not output until the measured cycle time falls below the target cycle time.

20. The apparatus for taking out a molded product according to claim 14, wherein:
the history storing section stores the measured cycle time that is below the target cycle time before outputting the detection signal and the measured cycle time that exceeds the target cycle time before outputting the detection signal, once the detection signal is output.

* * * * *